(12) United States Patent
Kim et al.

(10) Patent No.: US 7,902,715 B2
(45) Date of Patent: Mar. 8, 2011

(54) SELF MAGNETIZING MOTOR

(75) Inventors: Jae-Min Kim, Seoul (KR); Sung-Ho Lee, Gyeonggi-Do (KR); Jin-Soo Park, Incheon (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 12/227,145

(22) PCT Filed: Apr. 25, 2007

(86) PCT No.: PCT/KR2007/002026
§ 371 (c)(1),
(2), (4) Date: Nov. 7, 2008

(87) PCT Pub. No.: WO2007/129821
PCT Pub. Date: Nov. 15, 2007

(65) Prior Publication Data
US 2009/0236925 A1    Sep. 24, 2009

(30) Foreign Application Priority Data

May 10, 2006   (KR) .................. 10-2006-0042123

(51) Int. Cl.
*H02K 21/12* (2006.01)

(52) U.S. Cl. ............ 310/216.074; 310/216.093; 310/152
(58) Field of Classification Search ............ 310/216.074, 310/216.093, 186, 152
See application file for complete search history.

(56) References Cited

U.S. PATENT DOCUMENTS

| 710,425 | A | * | 10/1902 | Churchward ......... 310/216.093 |
|---|---|---|---|---|
| 3,885,302 | A | * | 5/1975 | Boesel ............................. 29/596 |
| 4,227,136 | A | | 10/1980 | Roesel |
| 5,051,640 | A | | 9/1991 | Freise |
| 6,020,712 | A | | 2/2000 | Roesel et al. |

* cited by examiner

*Primary Examiner* — Dang D Le
(74) *Attorney, Agent, or Firm* — McKenna Long & Aldridge LLP

(57) ABSTRACT

A self magnetizing motor, in which a magnetic substance is disposed at the rotor and a stator is provided with a magnetizing portion to magnetize the magnetic substance, and the magnetizing portion forms an exciter pole protruding toward the magnetic substance and a tip portion tapered at an end of the exciter pole, wherein a width of the exciter pole, a protruding length of the tip portion, and a width of the tip portion are formed in the ratio of 8-9:2-2.5:1-2.4, thereby increasing the intensity of magnetizing of the magnetic substance thus to improve the motor performance.

27 Claims, 6 Drawing Sheets

[Fig. 1]
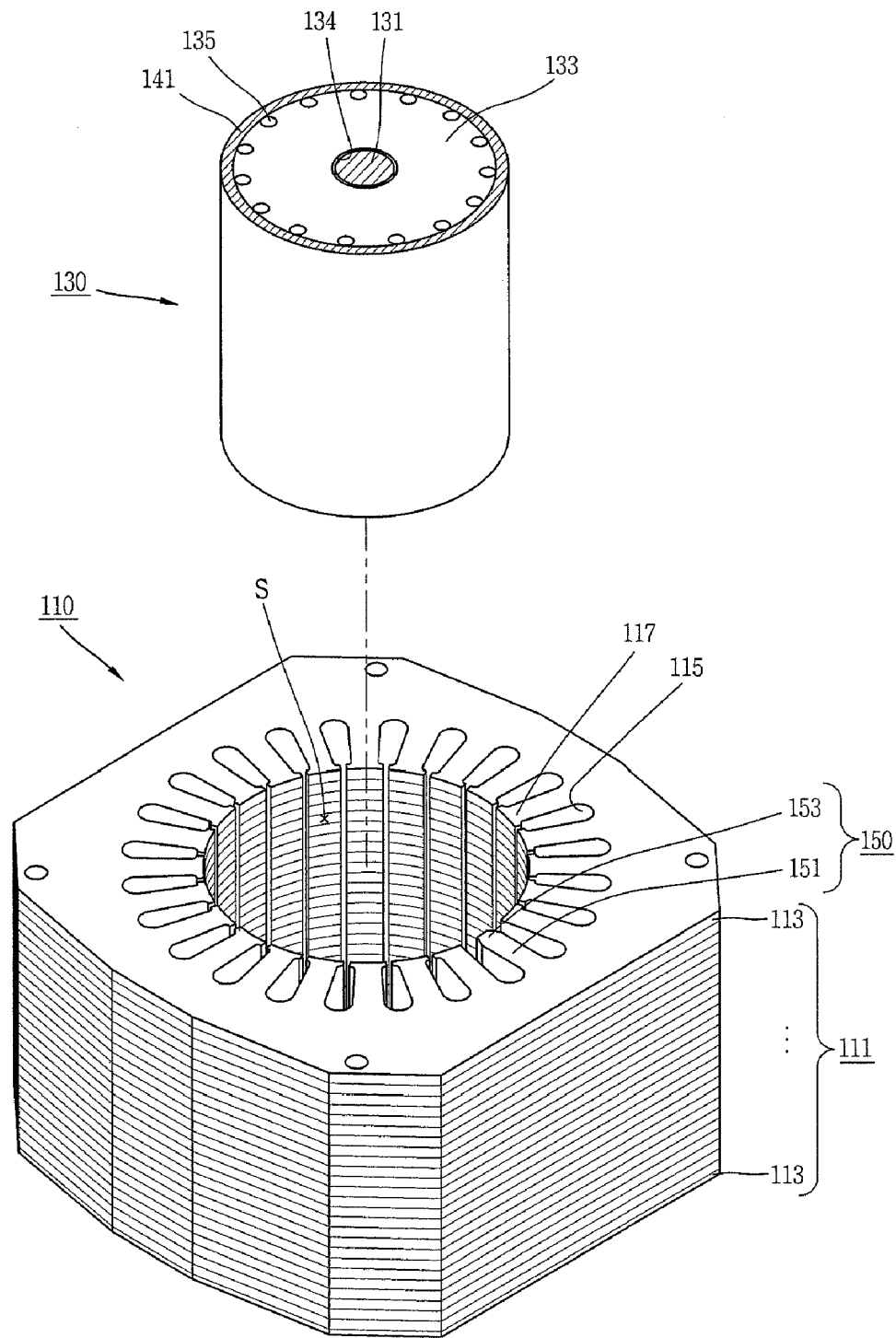

[Fig. 2]
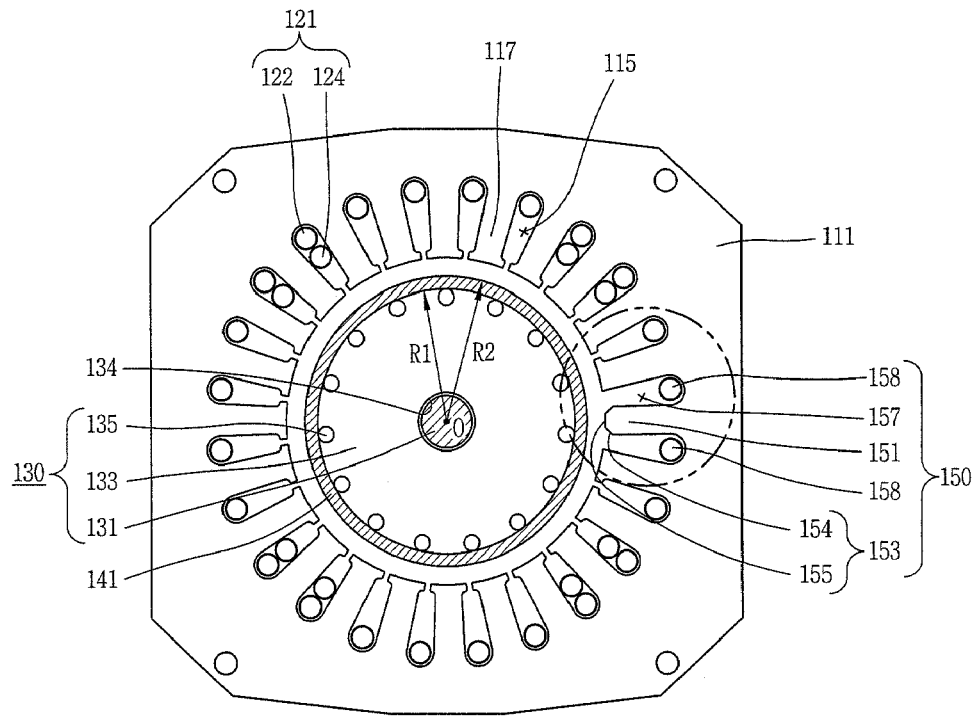
[Fig. 3]
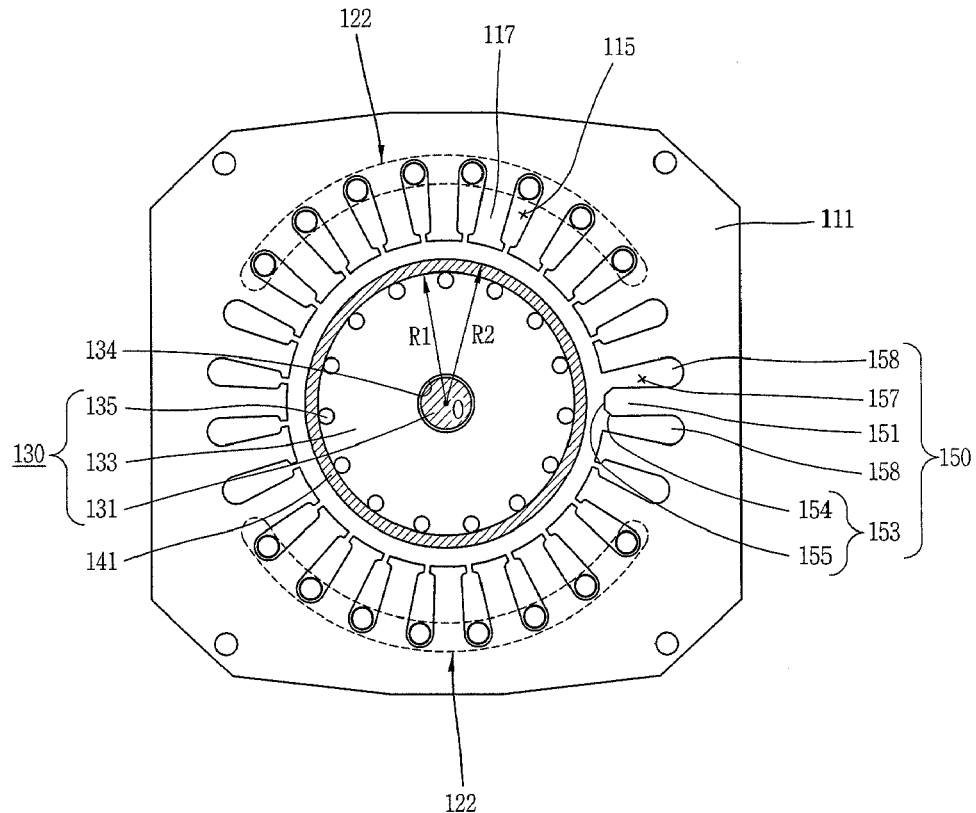

[Fig. 4]
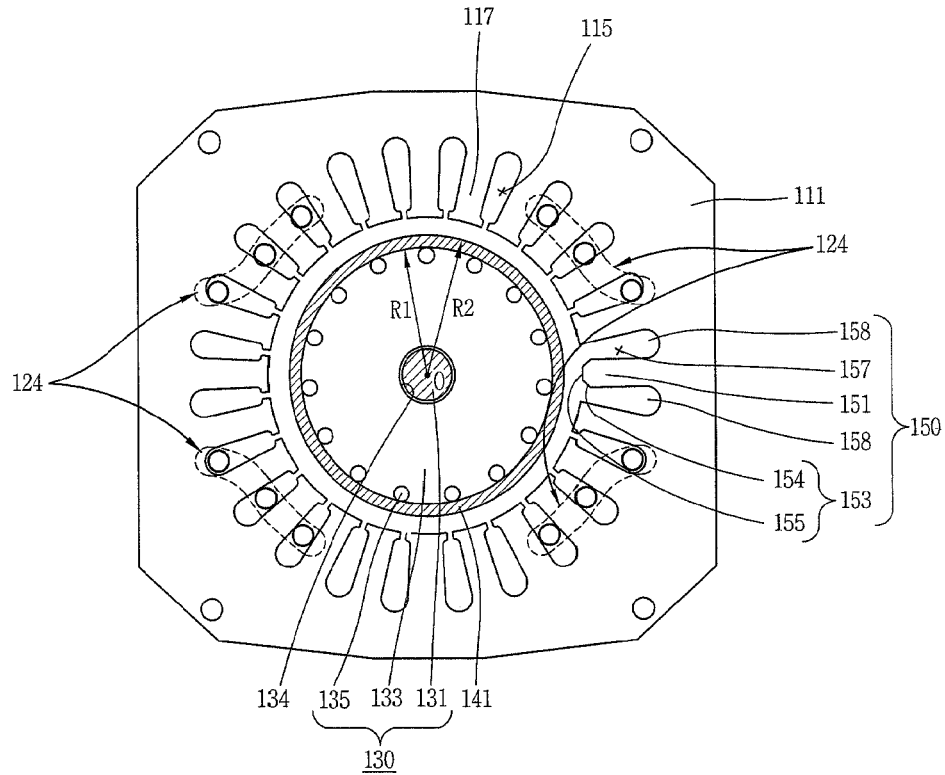
[Fig. 5]
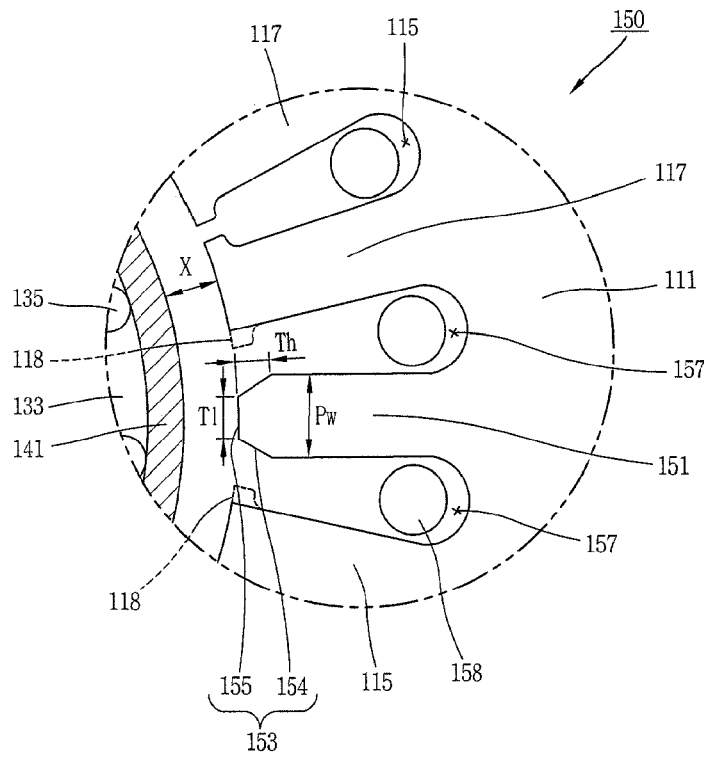

[Fig. 6]
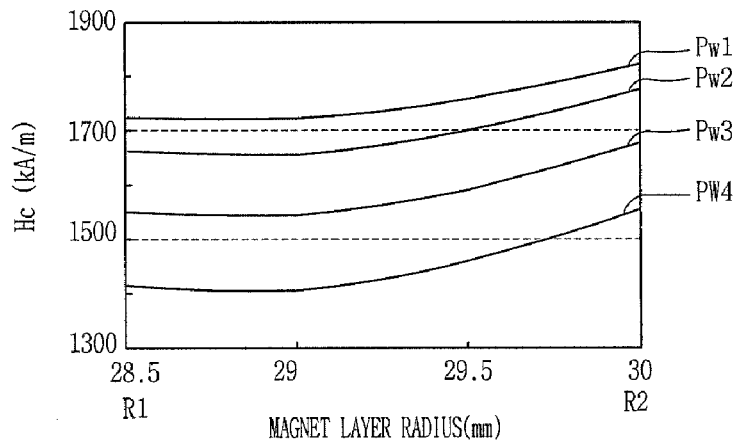
[Fig. 7]
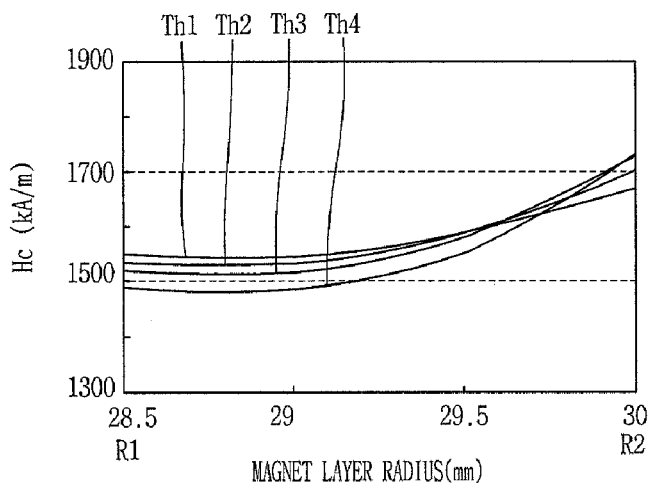
[Fig. 8]
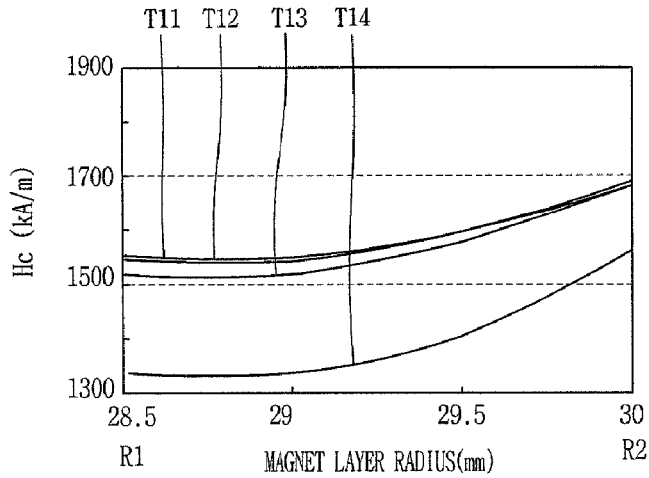

[Fig. 9]
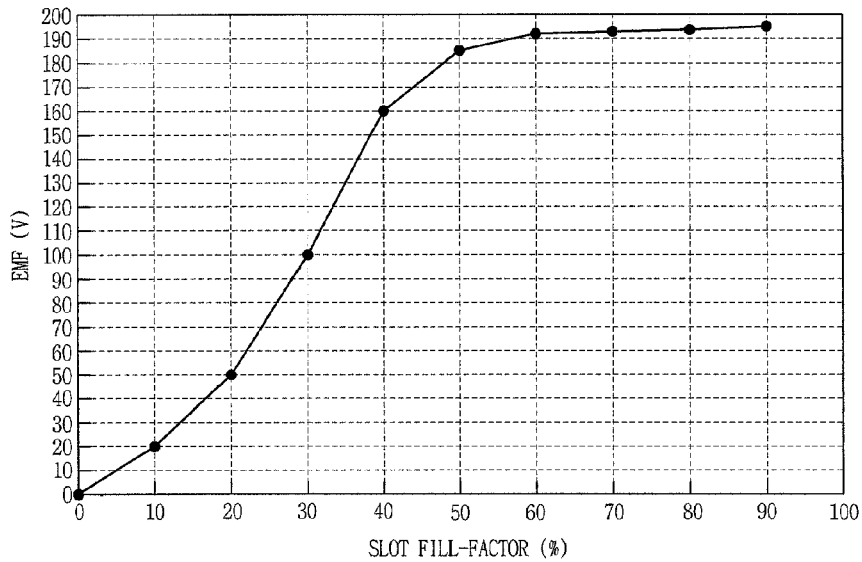
[Fig. 10]
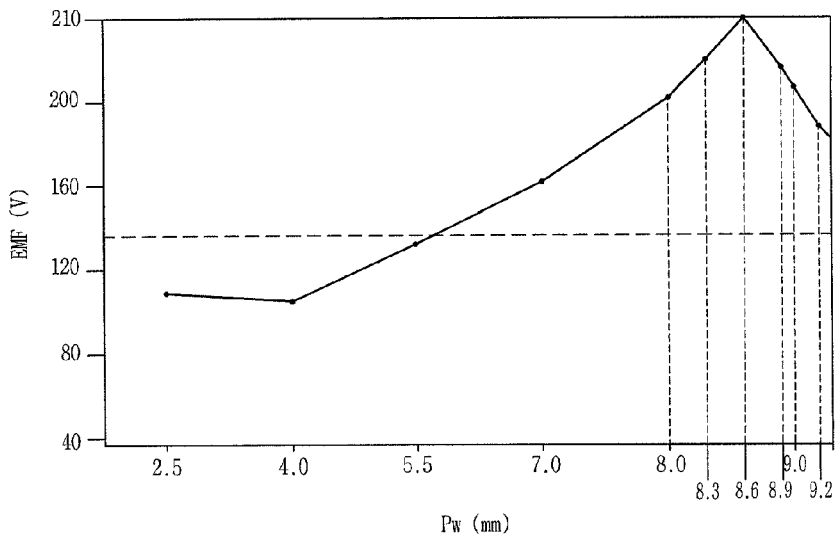
[Fig. 11]
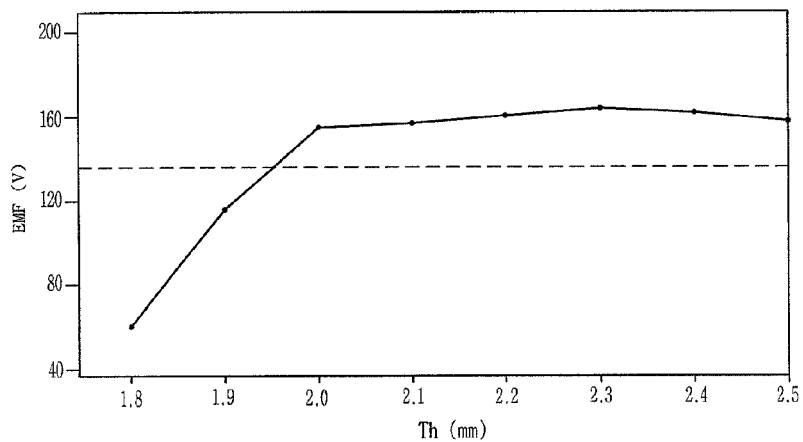

[Fig. 12]
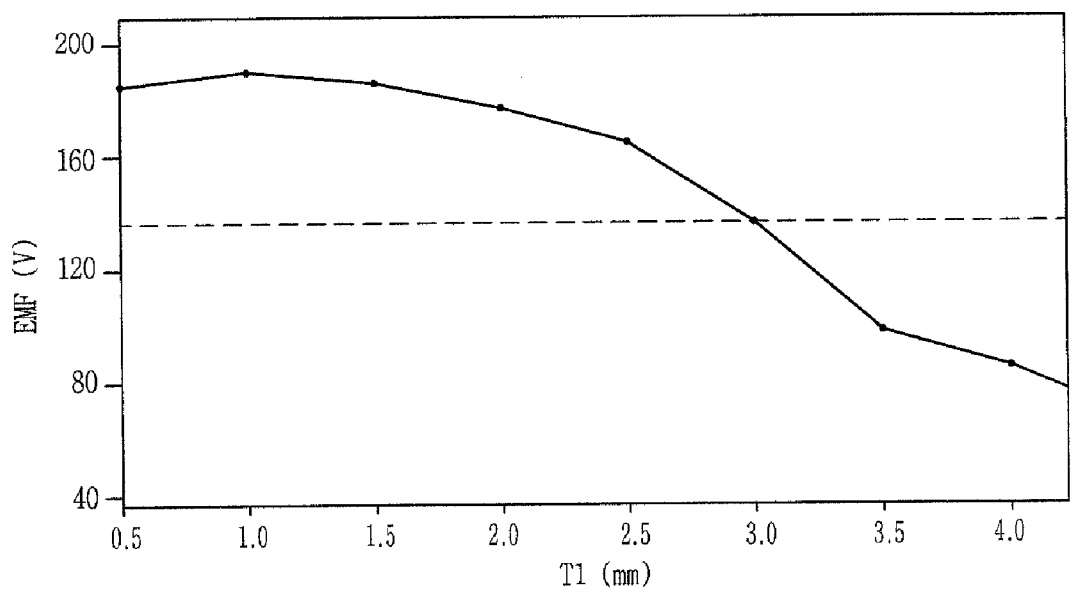

SELF MAGNETIZING MOTOR

This application is a national stage entry of International Patent Application No. PCT/KR2007/002026 filed Apr. 25, 2007, and claims the benefit of Korean Application No. 10-2006-0042123 filed May 10, 2006, which are hereby incorporated by reference for all purposes as if fully set forth herein.

DISCLOSURE OF INVENTION

Technical Solution

The present invention relates to a self magnetizing motor, and more particularly, to a self magnetizing motor capable of improving a motor performance by increasing an intensity of magnetizing of a magnetic substance.

In general, a motor is a device which transforms electric energy into mechanical energy, and can be divided into a direct current motor (DC motor) and an alternating current motor (AC motor) according to supply power.

The alternating current motor can be further divided into an induction motor, a synchronous motor, a commutator motor, and the like. The induction motor can be divided into a single-phase induction motor and a three-phase induction motor.

In general, the single-phase induction motor has a simple structure and is rigid and relatively easy to obtain single-phase power, thereby being widely used as a driving motor in electronic machines for households, offices, industries, and agriculture.

Since the single-phase induction motor cannot start by itself, a main coil and a sub-coil that has a current phase faster than the main coil by 90 degrees are required to generate a starting torque. And the main coil and the sub-coil are constantly wound on a stator slot.

In a prior art single-phase induction motor, a rotational magnetic field is generated when the alternating power is applied to the main coil and the sub-coil being wound on the stator slot at the time of initial starting. An induced current flows to a conductor bar of the rotor, the rotor then starts rotating. Herein, the current flowing to the sub-coil is interrupted by a current breaker, thereby flowing the current to the main coil only. Accordingly, the rotor is rotated with a certain slip.

However, in the prior art single-phase induction motor, the rotor is rotated only by an induction, thereby generating a slip of the rotor thus to reduce motor performance.

Therefore, it is an object of the present invention to provide a self magnetizing motor capable of enhancing motor performance by increasing the magnetomotive force.

It is another object of the present invention to provide a self magnetizing motor capable of improving motor performance by increasing an intensity of magnetizing of a magnetic substance.

To achieve these and other advantages and in accordance with the purpose of the present invention, as embodied and broadly described herein, there is provided a self magnetizing motor, comprising: a stator that includes a stator core having a plurality of slots, and a stator coil wound on each of the slots; a rotor that is rotated by mutual induction at the time of applying power to the stator coil; a magnetic substance that is concentrically formed with the rotor and rotates with the rotor; and a magnetizing portion that has an exciter pole protruding toward the magnetic substance, and an exciter coil being wound at a periphery of the exciter pole so as to magnetize the magnetic substance, wherein a width of the exciter pole is 8.0-9.0 mm.

Herein, a tip portion is formed to be tapered at an end of the exciter pole. Preferably, the tip portion has a protruding length of 2.0-2.5 mm and a width of 1.0-2.4 mm.

Preferably, a width Pw of the exciter pole, a protruding length Th of the tip portion, and a width Tw of the tip portion are formed in the ratio of 8-9:2-2.5:1-2.4 so as to increase the electromotive force.

More preferably, the width Pw of the exciter pole, the protruding length Th of the tip portion, and the width Tw of the tip portion are formed in the ratio of 8.6:2.3:1.0 so as to maximize the electromotive force.

According to another aspect of the present invention, there is provided a self magnetizing motor, comprising: a stator that includes a stator core having a plurality of slots, and a stator coil wound on each of the slots; a rotor that is rotated by mutual induction at the time of applying power to the stator coil; a magnetic substance that is concentrically formed with the rotor and rotates with the rotor; and a magnetizing portion that has an exciter pole protruding toward the magnetic substance, and an exciter coil being wound at a periphery of the exciter pole so as to magnetize the magnetic substance, wherein a tip portion having a protruding length of 2.0-2.5 mm is formed to be tapered at an end of the exciter pole.

According to still another aspect of the present invention, there is provided a self magnetizing motor, comprising: a stator that includes a stator core having a plurality of slots, and a stator coil wound on each of the slots; a rotor that is rotated by mutual induction at the time of applying power to the stator coil; a magnetic substance that is concentrically formed with the rotor and rotates with the rotor; and a magnetizing portion that has an exciter pole protruding toward the magnetic substance, and an exciter coil being wound at a periphery of the exciter pole so as to magnetize the magnetic substance, wherein a tip portion having an end width of 1.0-2.4 mm is formed to be tapered at an end of the exciter pole.

The foregoing and other objects, features, aspects and advantages of the present invention will become more apparent from the following detailed description of the present invention when taken in conjunction with the accompanying drawings.

The above, and other objects, features, and advantages of the present invention will be made apparent form the following description of the preferred embodiments, given as non-limiting examples, with reference to the accompanying drawings in which:

FIG. 1 is an exploded perspective view showing the self magnetizing motor according to the present invention;

FIG. 2 is a cross sectional view showing the self magnetizing motor according to the present invention;

FIG. 3 is a cross sectional view showing the main coil of FIG. 2;

FIG. 4 is a cross sectional view showing the sub-coil of FIG. 2;

FIG. 5 is an enlarged view showing the main part of FIG. 2;

FIG. 6 is a graph showing the intensity of a magnetic field of a magnetic substance according to the change of a width of an exciter pole;

FIG. 7 is a graph showing the intensity of a magnetic field of a magnetic substance according to the change of a protruding length of a tip portion;

FIG. 8 is a graph showing the intensity of a magnetic field of a magnetic substance according to the change of a width of a tip portion;

FIG. 9 is a graph showing the electromotive force according to a slot fill-factor;

FIG. 10 is a graph showing the relationship between a width of an exciter pole and the electromotive force;

FIG. 11 is a graph showing the relationship between a protruding length of a tip portion and the electromotive force; and FIG. 12 is a graph showing the relationship between a width of a tip portion and the electromotive force.

Hereinafter, a self magnetizing motor according to the preferred embodiments of the present invention will be explained in more detail with reference to the accompanying drawings.

As shown in FIGS. 1 through 4, the self magnetizing motor includes a stator 110 that includes a stator core 111 having a plurality of slots 115, and a stator coil 121 wound on each of the slots 115; a rotor 130 that is rotated by mutual induction at the time of applying power to the stator coil 121; a magnetic substance 141 that is concentrically formed with the rotor 130 and rotates with the rotor 130; and a magnetizing portion 150 that has an exciter pole 151 protruding toward the magnetic substance 141, a tip portion 153 formed at an end of the exciter pole 151 and an exciter coil 158 being wound at a periphery of the exciter pole 151 so as to magnetize the magnetic substance 141.

Referring to FIGS. 2 through 4, the stator 110 includes a stator core 111 having a receiving space S for receiving the rotor 130 therein and formed by insulation-laminating steel plates having a plurality of slots 115 and teeth 117 at a periphery of the receiving space S, and a stator coil 121 that is wound on the stator core 111. The stator coil 121 is provided with a main coil 122, and a sub-coil 124 having a phase difference of a current with respect to the main coil 122. An extending portion 118 extending toward both directions is formed at an end of each teeth 117 along a circumferential direction. Herein, in the present embodiment, the stator 110 is in a single-phase and has 24 slots 115.

The rotor 130 includes a rotor core 133 that is formed by laminating a steel plate having an axial hole 134 so as to insert a rotational shaft 131 at the center thereof, and a plurality of conductor bars 135 that are adjacent to the circumference of the rotor core 133 and are spaced from each other with a certain distance along the circumferential direction. A magnetic substance 141 is provided at an outer surface of the rotor core 133 for magnetization. The magnetic substance 141 is formed in a layer structure by being coated on the outer surface of the rotor core 133. The magnetic substance 141 is formed to have a certain inner radius R1 and outer radius R2 from the center O of the rotor core 133. Herein, the magnetic substance 141 may be formed to have a cylindrical shape so that the magnetic substance 141 is coupled to rotate with the rotor core 133 at the outer surface of the rotor core 133. The magnetic substance 141 is formed to have a certain air gap G from the stator 110.

Meanwhile, as shown in FIG. 5, a magnetizing portion 150 is formed at the stator 110 for selectively magnetizing the magnetic substance 141. The magnetizing portion 150 includes an exciter pole 151 that is formed to be protruded toward the magnetic substance 141 at the stator core 111, a tip portion 153 that is formed at the end of the exciter pole 151 to be tapered at the end of the exciter pole 151, and an exciter coil 158 that is wound at a periphery of the exciter pole 151. The tip portion 153 includes both sides 154 tapered with an inclination, and one end 155. Herein, the tip portion 153 is formed to have a certain air gap G from the magnetic substance 141.

An exciter slot 157 is formed at a periphery of the exciter pole 151. The extending portion 118 of the teeth 117 of the stator 110 which is adjacent to the exciter slot 157 is cut out so as to increase the size of the exciter slot 157.

In order to improve an intensity of magnetizing after magnetization of the magnetic substance 141, that is, the intensity of the magnetic field, the exciter pole 151 and the tip portion 153 are formed to have a constant ratio among a width Pw of the exciter pole 151, a protruding length Th of the side 154 of the tip portion 153, as a length in a radial direction of the side 154 of the tip portion 153, and a width T1 of the end 155 of the tip portion 153. That is, preferably, Pw:Th:T1 is to be maintained in the ratio of 8-9:2-2.5:1-2.4.

More preferably, the width Pw of the exciter pole 151, the protruding length Th of the side 154 of the tip portion 153, and the width T1 of the end 155 of the tip portion 153 are in the ratio of 8.6:2.3:1.0 for maximizing the electromotive force.

FIG. 6 is a graph showing the intensity of the electromagnetic field of a magnetic substance according to the change of the width of the exciter pole. Herein, X-axis indicates the length between the inner radius and the outer radius of the magnetic substance 141, and Y-axis indicates an intensity Hc of the magnetic field of the magnetic substance 141. That is, the inner radius R1 of the magnetic substance 141 is 28.5 mm and the outer radius R2 of the magnetic substance 141 is 30 mm in the present embodiment.

The curved line Pw1 represents the intensity of the magnetic field when the width of the exciter pole 151 is 9 mm, and the curved line Pw2 represents the intensity of the magnetic field when the width of the exciter pole 151 is 8 mm. The curved line Pw3 represents the intensity of the magnetic field when the width of the exciter pole 151 is 7 mm and the curved line Pw4 represents the intensity of the magnetic field when the width of the exciter pole 151 is 6 mm. Therefore, the wider the exciter pole 151, the greater the intensity of the magnetic field of the magnetic substance 141.

FIG. 7 is a graph showing the intensity of the magnetic field of the magnetic substance according to the change of a protruding length of a tip portion. The X-axis and Y-axis are the same as those in FIG. 6. The curved line Th1 represents the intensity of the magnetic field when the protruding length of the tip portion 153 is 2.0 mm. The curved line Th2 represents the intensity of the magnetic field when the protruding length of the tip portion 153 is 2.1 mm. The curved lines Th3 and Th4 represent the intensity of the magnetic field when the protruding length of the tip portion 153 is 2.2 mm and 2.4 mm, respectively. That is, the inner radius portion and the outer radius portion have a different intensity of the magnetic field of the magnetic substance 141 according to the change of the protruding length of the tip portion 153. Accordingly, it is preferable that the outer radius portion of the magnetic substance 141 has a greater intensity of the magnetic field. In the present embodiment, the curved line Th3 is preferably implemented.

FIG. 8 is a graph showing the intensity of the magnetic field of a magnetic substance according to the change of a width of a tip portion. The X-axis and Y-axis are the same as those in FIG. 6. The curved line T11 represents the intensity of the magnetic field when the width of the tip portion 153 is 1.0 mm. The curved line T12 represents the intensity of the magnetic field when the width of the tip portion 153 is 1.2 mm. The curved line T13 and T14 represent the intensity of the magnetic field when the width of the tip portion 153 is 1.4 mm and 1.6 mm, respectively. When the width of the tip portion 153 is 1.0 mm-1.4 mm, there is little difference in the intensity of the magnetic field of the magnetic substance 141. However, when the width of the tip portion 153 is 1.6 mm, the intensity of the magnetic field is remarkably reduced.

Meanwhile, the intensity of the magnetic field of the magnetic substance 141, as aforementioned, is affected by a slot fill-factor of the exciter coil 158 as well as the width of the exciter pole 151, the protruding length of the tip portion 153, and the width of the tip portion 153. Herein, the slot fill-factor indicates the cross section of the exciter coil 158/area of exciter slot 157. Preferably, the slot fill-factor is 60% or more than 60%, as shown in FIG. 9.

FIG. 10 is a graph showing the relationship between a width of an exciter pole and the electromotive force. When the width of the exciter pole 151 is 4.0 mm, the electromotive force is minimized. The electromotive force then gradually increases to be maximized when the width of the exciter pole 151 is 8.6 mm, and thereafter it reduces. Preferably, the width of the exciter pole 151 is between 8.0 mm and 9.0 mm.

FIG. 11 is a graph showing the relationship between a protruding length of a tip portion and the electromotive force. When the protruding length of the tip portion 153 is 1.8 mm, the electromotive force gradually increases. The electromotive force is maximized when the protruding length of the tip portion 153 is 2.3 mm, and then reduces. Preferably, the protruding length of the tip portion 153 is between 2.0 mm and 2.5 mm, corresponding to 22%-32% of the width of the exciter pole 151.

FIG. 12 is a graph showing the relationship between a width of a tip portion and the electromotive force. When the width of the tip portion 153 is 1.0 mm, the electromotive force is maximized. When the width thereof increases or reduces on the basis of 1.0 mm, the electromotive force is also reduced. Herein, when the width of the tip portion 153 is 0.5 mm, the electromotive force is great. Preferably, however, in consideration of the transformed degree of the tip portion 153, the width of the tip portion 153 is between 1.0 mm and 2.4 mm, corresponding to 11%-35% of the width of the exciter pole 151.

Hereinafter, the operating effect of the self magnetizing motor of the present invention will be explained. The rotational magnetic field is generated when an alternating power from the exterior is applied to the main coil 122 wound on the stator slot 115 at the time of initial starting and the sub-coil 124 having a current phase faster than the main coil 122 by 90 degrees.

Herein, an induced current flows to the conductor bar 135 of the rotor 130 by the rotational magnetic field of the stator 110. The rotor 130 starts rotating by an interaction between the magnetic field generated by the induced current and the rotational magnetic field. Herein, the magnetic substance 141 is magnetized in a low density by the rotational magnetic field of the stator 110, that is, a hysteresis effect occurs. Accordingly, the rotor 130 is rotated by an integration torque between the hysteresis torque by the hysteresis effect and the induction torque by the induced current.

The rotor 130 is rotated by being slipped after its starting. If the speed of the rotor 130 is more than a reference speed, the current flowing to the sub-coil 124 is interrupted by the current breaker. Accordingly, the current flows only to the main coil 122.

Meanwhile, if a current is applied to the exciter coil 158 when the rotor 130 is rotated at a speed corresponding to 70%-80% of a synchronous speed of the rotational magnetic field of the stator 110, i.e., at a speed of 2,520 rpm-2,880 rpm, the magnetic substance 141 is magnetized by magnetic flux generated by the exciter coil 158. Herein, the spot fill-factor is maintained to be 60% and the width of the exciter pole 151, the protruding length of the tip portion 153, and the width of the tip portion 153 are formed in the ratio of 8-9:2-2.5:1-2.4, thereby generating high electromotive force thus to greatly increase efficiency of the motor. In particular, when the exciter pole 151 and the tip portion 153 are formed so that a ratio among the width of the exciter pole 151, the protruding length of the tip portion 153, and the width of the tip portion 153 is 8.6:2.3:1.0, the motor performance can be maximized.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A self magnetizing motor, comprising:
   a stator that includes a stator core having a plurality of slots, and a stator coil wound on each of the slots;
   a rotor that is rotated by mutual induction at the time of applying power to the stator coil;
   a magnetic substance that is concentrically formed with the rotor and rotates with the rotor; and
   a magnetizing portion that has an exciter pole protruding toward the magnetic substance, and an exciter coil being wound at a periphery of the exciter pole so as to magnetize the magnetic substance,
   wherein a width of the exciter pole is 8.0-9.0 mm,
   wherein a tip portion is formed to be tapered at an end of the exciter pole, wherein a width of the tip portion is narrower than the width of the exciter pole.

2. The self magnetizing motor of claim 1, wherein the tip portion has a protruding length of 2.0-2.5 mm.

3. The self magnetizing motor of claim 1, wherein the end of the tip portion has a width of 1.0-2.4 mm.

4. The self magnetizing motor of claim 1, wherein the tip portion has a protruding length of 2.0-2.5 mm, and an end width of 1.0-2.4 mm.

5. The self magnetizing motor of claim 1, wherein the tip portion has a protruding length corresponding to 22%-32% of the width of the pole.

6. The self magnetizing motor of claim 1, wherein the tip portion has a width corresponding to 11%-35% of the width of the pole.

7. The self magnetizing motor of claim 1, wherein the width of the exciter pole, the protruding length of the tip portion, and the width of the tip portion are formed in the ratio of 8-9:2-2.5:1-2.4.

8. The self magnetizing motor of claim 7, wherein the width of the exciter pole, the protruding length of the tip portion, and the width of the tip portion are formed in the ratio of 8.6:2.3:1.0.

9. The self magnetizing motor of claim 1, wherein an exciter slot is formed at a periphery of the exciter pole, and the teeth of the stator core at a periphery of the exciter slot are cut out so as to increase the exciter slot.

10. The self magnetizing motor of claim 1, wherein the rotor is rotatably disposed at an inner side of the stator, and the magnetic substance is formed at an outer surface of the rotor.

11. The self magnetizing motor of claim 10, wherein the magnetic substance is coated on the surface of the rotor.

12. The self magnetizing motor of claim 10, wherein the magnetic substance is formed in a cylindrical shape, and is coupled to the outer surface of the rotor.

13. The self magnetizing motor of claim 1, wherein a cross section of the exciter coil corresponds to 60% or more than 60% of that of the exciter slot.

14. A self magnetizing motor, comprising:
   a stator that includes a stator core having a plurality of slots, and a stator coil wound on each of the slots;

a rotor that is rotated by mutual induction at the time of applying power to the stator coil;

a magnetic substance that is concentrically formed with the rotor and rotates with the rotor; and a magnetizing portion that has an exciter pole protruding toward the magnetic substance, and an exciter coil being wound at a periphery of the exciter pole so as to magnetize the magnetic substance, wherein a tip portion having a protruding length of 2.0-2.5 mm is formed to be tapered at an end of the exciter pole, wherein a width of the tip portion is narrower than the width of the exciter pole.

15. The self magnetizing motor of claim 14, wherein the width of the tip portion is 1.0-2.4 mm.

16. A self magnetizing motor, comprising:
a stator that includes a stator core having a plurality of slots, and a stator coil wound on each of the slots;
a rotor that is rotated by mutual induction at the time of applying power to the stator coil;
a magnetic substance that is concentrically formed with the rotor and rotates with the rotor; and
a magnetizing portion that has an exciter pole protruding toward the magnetic substance, and an exciter coil being wound at a periphery of the exciter pole so as to magnetize the magnetic substance, wherein a tip portion having an end width of 1.0-2.4 mm is formed to be tapered at an end of the exciter pole, wherein a width of the tip portion is narrower than a width of the exciter pole.

17. The self magnetizing motor of claim 16, wherein a width of the exciter pole is 8.0-9.0 mm, and the tip portion has a protruding length of 2.0-2.5 mm.

18. A self magnetizing motor, comprising:
a stator that includes a stator core having a plurality of slots, and a stator coil wound on each of the slots;
a rotor that is rotated by mutual induction at the time of applying power to the stator coil;
a magnetic substance that is concentrically formed with the rotor and rotates with the rotor; and
a magnetizing portion that has an exciter pole protruding toward the magnetic substance, and an exciter coil being wound at a periphery of the exciter pole so as to magnetize the magnetic substance, wherein a width of the exciter pole is 8.0-9.0 mm, wherein a tip portion is formed to be tapered at an end of the exciter pole, wherein the width of the exciter pole, the protruding length of the tip portion, and a width of the tip portion are formed in the ratio of 8-9:2-2.5:1-2.4.

19. The self magnetizing motor of claim 18, wherein the tip portion has a protruding length corresponding to 22%-32% of the width of the pole.

20. The self magnetizing motor of claim 18, wherein the tip portion has a width corresponding to 11%-35% of the width of the pole.

21. The self magnetizing motor of claim 18, wherein an exciter slot is formed at a periphery of the exciter pole, the teeth of the stator core at a periphery of the exciter slot are cut out so as to increase the exciter slot.

22. The self magnetizing motor of claim 18, wherein the rotor is rotatably disposed at an inner side of the stator, and the magnetic substance is formed at an outer surface of the rotor.

23. The self magnetizing motor of claim 22, wherein the magnetic substance is coated on the surface of the rotor.

24. The self magnetizing motor of claim 22, wherein the magnetic substance is formed in a cylindrical shape, and is coupled to the outer surface of the rotor.

25. The self magnetizing motor of claim 18, wherein a cross section of the exciter coil corresponds to 60% or more than 60% of that of the exciter slot.

26. A self magnetizing motor, comprising:
a stator that includes a stator core having a plurality of slots, and a stator coil wound on each of the slots;
a rotor that is rotated by mutual induction at the time of applying power to the stator coil;
a magnetic substance that is concentrically formed with the rotor and rotates with the rotor; and
a magnetizing portion that has an exciter pole protruding toward the magnetic substance, and an exciter coil being wound at a periphery of the exciter pole so as to magnetize the magnetic substance, wherein a tip portion having a protruding length of 2.0-2.5 mm is formed to be tapered at an end of the exciter pole, wherein the width of the exciter pole, the protruding length of the tip portion, and a width of the tip portion are formed in the ratio of 8-9:2-2.5:1-2.4.

27. A self magnetizing motor, comprising:
a stator that includes a stator core having a plurality of slots, and
a stator coil wound on each of the slots;
a rotor that is rotated by mutual induction at the time of applying power to the stator coil;
a magnetic substance that is concentrically formed with the rotor and rotates with the rotor; and
a magnetizing portion that has an exciter pole protruding toward the magnetic substance, and an exciter coil being wound at a periphery of the exciter pole so as to magnetize the magnetic substance, wherein a tip portion having an end width of 1.0-2.4 mm is formed to be tapered at an end of the exciter pole, wherein the width of the exciter pole, the protruding length of the tip portion, and a width of the tip portion are formed in the ratio of 8-9:2-2.5:1-2.4.

* * * * *